(12) United States Patent
Soma

(10) Patent No.: US 8,051,688 B2
(45) Date of Patent: Nov. 8, 2011

(54) LOCK DEVICE

(75) Inventor: Toshiaki Soma, Utsunomiya (JP)

(73) Assignee: Nifco Inc., Kanagawa (JP)

( * ) Notice: Subject to any disclaimer, the term of this patent is extended or adjusted under 35 U.S.C. 154(b) by 489 days.

(21) Appl. No.: 12/226,208

(22) PCT Filed: Jan. 31, 2007

(86) PCT No.: PCT/JP2007/051644
§ 371 (c)(1),
(2), (4) Date: Nov. 20, 2008

(87) PCT Pub. No.: WO2007/122836
PCT Pub. Date: Nov. 1, 2007

(65) Prior Publication Data
US 2009/0188288 A1  Jul. 30, 2009

(30) Foreign Application Priority Data

Apr. 18, 2006  (JP) ................. 2006-114304

(51) Int. Cl.
*B65D 55/14* (2006.01)
(52) U.S. Cl. ............... 70/162; 70/344; 70/158; 292/33; 292/48; 296/37.8
(58) Field of Classification Search ........ 70/158, 70/159, 160, 161, 162, 163, 164, 165, 166, 70/167, 168, 169; 296/24.46, 24.36, 37.8; 292/41, DIG. 61, 137, 163, 39
See application file for complete search history.

(56) References Cited

U.S. PATENT DOCUMENTS

| 4,547,006 A | * | 10/1985 | Castanier ................ 292/37 |
| 5,481,889 A | * | 1/1996 | Richard et al. ............. 70/118 |
| 5,722,275 A | * | 3/1998 | Price et al. ............. 70/379 R |
| 5,732,994 A | * | 3/1998 | Stancu et al. ............. 296/37.8 |
| 6,540,268 B2 | * | 4/2003 | Pauser ................ 292/48 |
| 7,048,311 B2 | * | 5/2006 | Sawatani et al. ........... 292/33 |
| 2004/0165339 A1 | | 8/2004 | Nakajima et al. |

FOREIGN PATENT DOCUMENTS

| JP | S62-110462 U | 7/1987 |
| JP | S63-186868 U | 11/1988 |
| JP | H03-45504 Y2 | 9/1991 |
| JP | H04-278830 A | 10/1992 |
| JP | 2000-160886 A | 6/2000 |

* cited by examiner

*Primary Examiner* — Suzanne Barrett
*Assistant Examiner* — David E Sosnowski
(74) *Attorney, Agent, or Firm* — Manabu Kanesaka

(57) ABSTRACT

A lock device includes a main body, a lock that locks and unlocks a lid member, an operating button, an engagement member, a rotor that rotates by locking and unlocking the lock, a coupling member, and an arm disposed on the rotor and coupled to one end of the coupling member. The coupling member interlocks the operation button and the engagement member with unlocking the lock and releases an interlock between the operation button and the engagement member with locking the lock. The engagement member slides through the coupling member to disengage the engagement member from the main body by operating the operating button.

8 Claims, 6 Drawing Sheets

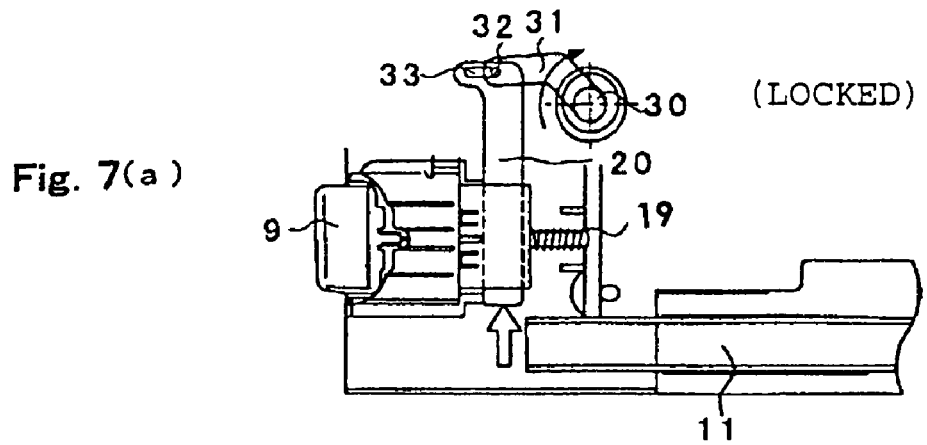
Fig. 7(a) (LOCKED)
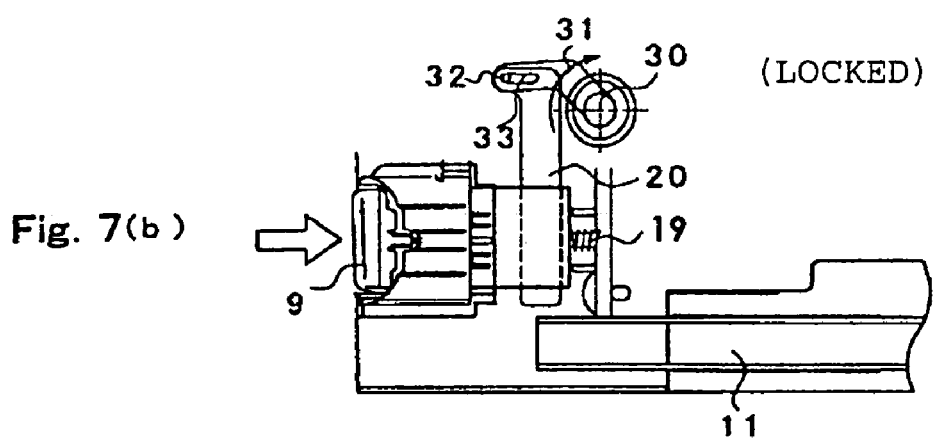
Fig. 7(b) (LOCKED)
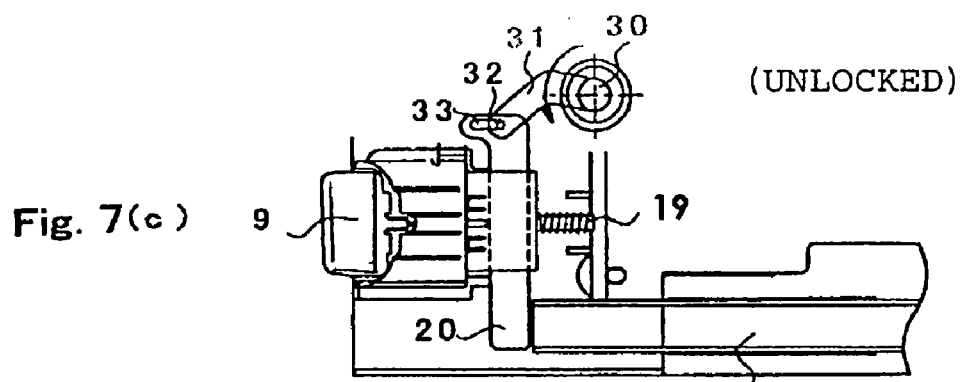
Fig. 7(c) (UNLOCKED)
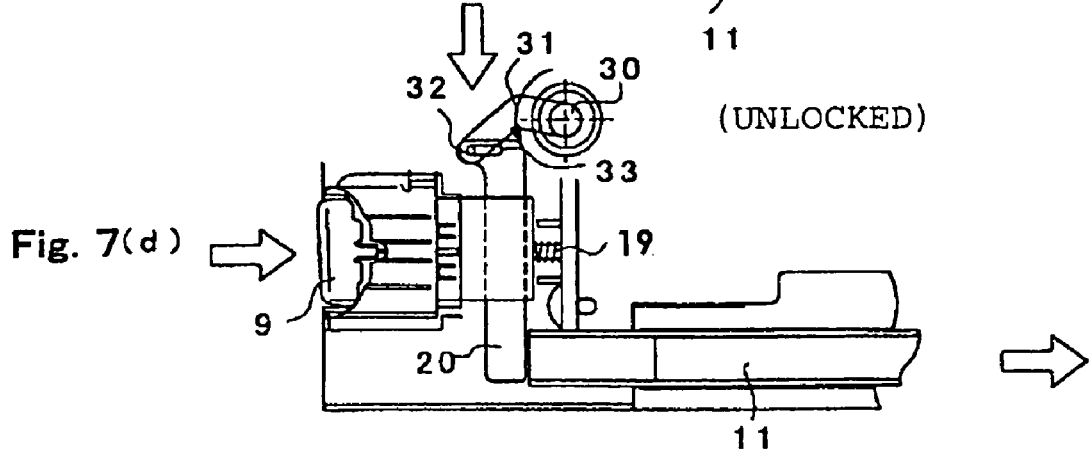
Fig. 7(d) (UNLOCKED)

LOCK DEVICE

TECHNICAL FIELD

The present invention relates to a lock device, which is adapted to lock a lid member with a lock in order to set the lid member in a closed state, more specifically a lock device, which is configured not only to be particularly resistant to unauthorized unlocking actions in a locked position in a sufficient way but also to smoothly perform an opening and closing operation after being unlocked.

BACKGROUND ART

As a center console disposed in an automobile, there has been known one wherein a lid member, which covers an upper opening of a center console box in an openable and closable way and is configured to serve as an armrest as well as shown in, e.g. Patent Document 1 listed below. In such a case, it is possible to house a relatively large article, such as a notebook computer, by making use of a feature that the console box has a relatively large volume and a great length in a front-to-rear direction. This type of structure is configured to protect a housed article from theft, such as breaking into a car, by providing a lid member with a lock device and locking the lid member in a closed state.

The lock device disclosed in Patent Document 2 listed below is configured to provide a lock to a lid member of a glove box so that a hook is swung by actuating the lock, and that even if an attempt is made to operate an operating button in a locked position, the lid member is prevented from being opened since any unauthorized action to the operating button is made ineffective to the hook in the locked position.
Patent Document 1: JP-A-4-278830
Patent Document 2: JP-Y-3-45504

DISCLOSURE OF THE INVENTION

Problems that the Invention is to Solve

In the prior art disclosed in Patent Document 1, the lid member is of a laterally openable type wherein a lock for engagement with the lid member is disposed at a single substantially middle portion in a free end of the lid member in a front-to-rear direction. This leads to a situation where the lock has a low resistant against unauthorized unlocking actions, i.e. a low locking force in a locked position. If the lid member has a great length or a large size, a gap is highly likely to be formed. If the lock has a low locking force in a locked position, it is possible to easily open the lid member by putting, e.g. a crowbar into a gap between the lid member and the main body of the console box.

In the prior art disclosed in Patent Document 2, even if an attempt is made to operate an operating button in the locked position, any unauthorized action to the operating button is ineffective. Although it is possible to eliminate a damage factor caused by forcibly operating the operating button, the resistance to unauthorized unlocking actions, i.e. the locking force in the locked position is low, which has caused the same problem as Patent Document 1. Further, since the structure disclosed in the latter prior art is configured, e.g. so that the hook is swung to be selectively brought into engagement with and disengagement from a counterpart of the glove box, and that when the main box of the console box is set in the locked position to switch the operating button to such a state as to make any unauthorized action to the operating button ineffective, the hook itself is moved in a direction to be away from a hook holder on the button, keeping the engagement with the counterpart of the glove box, the structure disclosed in the latter prior art has caused problems in that the switching load is increased and that the hook is highly likely to be worn.

The lock device according to the present invention is proposed to solve the above-described problems. It is an object of the present invention to provide a lock device, which is capable of preventing the occurrence of an excessive load, local wear and another problem in order to improve operation performance and quality by making any unauthorized action to an operating button ineffective even if an attempt is made to operate the operating button in a locked position. It is another object to provide a lock device, which is capable of not only reliably keeping a lid member in a closed state in a locked position but also operating a button to easily open the lid member in an unlocked position by being configured to close a main body with the lid member without forming a gap in the locked position and to be prevented from being forcibly unlocked by e.g. a picking tool.

Means of Solving the Problems

In order to attain these objects, the present invention is characterized in that a lock device which is adapted to hold a lid member with a lock at a counterpart of a main body in a closed state, includes an operating button for an unlocking operation; a slidable engagement member having an engageable portion, the engageable portion being configured to be selectively brought into engagement with and out of engagement with the counterpart of the main body; and a coupling member configured to interlock the operating button and the engagement member with a locking operation and the unlocking operation applied to the lock so that the operating button and the engagement member are set in an interlocked state by the unlocking operation and are set to be free of the interlocked state by the locking operation; whereby the engagement member is slid through the coupling member to bring the engagement member out of engagement with the main body by operating the operating button when the lock is set in an unlocked position.

The above-mentioned lock device is preferred to be specified as follows:
(a) The coupling member is supported so as to be slidable in a direction substantially orthogonal to a depressing direction of the operating button, and the engagement member is supported so as to be slidable in substantially the same direction as the depressing direction of the operating button.
(b) The lock device further includes a rotor rotated by each of the locking operation and the unlocking operation applied to the lock, and an arm disposed on the rotor, whereby the arm is operatively coupled to one end of the coupling member to slide the coupling member in synchronization with rotation of the rotor.
(c) The engagement member has the engageable portion disposed at least two positions in a sliding direction.
(d) The lock device further includes a biasing member for returning the operating button to the original position after the operating button is operated, and another biasing member for returning the engagement member in a direction to bring the engageable portion into engagement with the counterpart of the main body.
(e) The main body is a console box, and the lid member is swingably coupled to the console box at one end thereof in a longitudinal direction thereof and has the engagement member disposed along the other end in the longitudinal direction.

EFFECT OF THE INVENTION

In accordance with the present invention, unauthorized actions applied to the operating button are made ineffective in the locked position, and the engagement member is configured to be slid through the coupling member to be brought out of engagement with the counterpart of the body and to switch the lid member from the closed state to an open state by operating the operating button only in the unlocked position. In other words, although the lock device according to the present invention is the same as the one disclosed in Patent Document 2 in that unauthorized actions applied to the operating button are made ineffective, the lock device according to the present invention is free of problems, such as an excessive load and local wear, in comparison with the one disclosed in Patent Document 2 to improve operating performance and quality for reasons, e.g. that the engagement member is configured to be slid without being turned, and that the engagement member is configured to be slid through the coupling member as a different member disposed between the operating button and the engagement member so as to bring the engageable portions out of engagement with the main body by operating the operating button in the unlocked position.

When the coupling member is supported so as to be slidable in a direction substantially orthogonal to the depressing direction of the operating button, and when the engagement member is supported so as to be slidable in substantially the same direction as the depressing direction of the operating button, it is possible to effectively and reliably transmit respective operating forces to respective parts to stably maintain the operating performance because of the characteristic allocation of the coupling member to the operating button and the characteristic allocation of the engagement member to the operating button. When the lock device includes a rotor rotated by each of the locking operation and the unlocking operation applied to the lock, and an arm disposed on the rotor so that the arm is operatively coupled to one end of the coupling member to slide the coupling member in synchronization with rotation of the rotor, it is possible to stably maintain operating performance since the coupling member is linearly slid to selectively couple the operating button to the engagement member and disconnect the operating button from the engagement member in response to the locking and unlocking operations (key operations) applied to the lock.

When the engagement member has the engageable portion disposed at least two positions in a sliding direction, it is not only difficult for a gap to be formed between the lid member and the main body even if the lid member has a great length but also possible to double the resistance to unauthorized unlocking actions, i.e. a force for keeping the lid engaged with the main body in the locked position. When the lock device further includes a biasing member for returning the operating button to the original position after the operating button is operated, and another biasing member for returning the engagement member in a direction to bring the engageable portion into engagement with the counter part of the main body, it is possible to set the engagement of the engageable portion with the main body, i.e. the holding force at a designed level since the operating button can be reliably returned to the original position after operation by being biased by its dedicated biasing member and since the engagement member is biased by its dedicated biasing member. When the main body is a console box, and when the lid member is swingably coupled to the console box at one end thereof in a longitudinal direction thereof and has the engagement member disposed along the other end in the longitudinal direction, there is provided a preferred lock device with a lock, which can solve all problems that has been caused since the console box itself has a great length in a front-to-rear direction and a large size as discussed in the introduction part.

BRIEF DESCRIPTION OF THE DRAWINGS

FIGS. 7(*a*) to (*d*) are views showing how a key, an operating button, a coupling member and an engagement member are actuated one another.

BEST MODE FOR CARRYING OUT THE INVENTION

Now, an embodiment of the present invention will be described with reference to the accompanying drawings.

The description will be made in the order of application examples, the structure and the operation of the device according to the present invention.

APPLICATION EXAMPLES

Figure 1A:
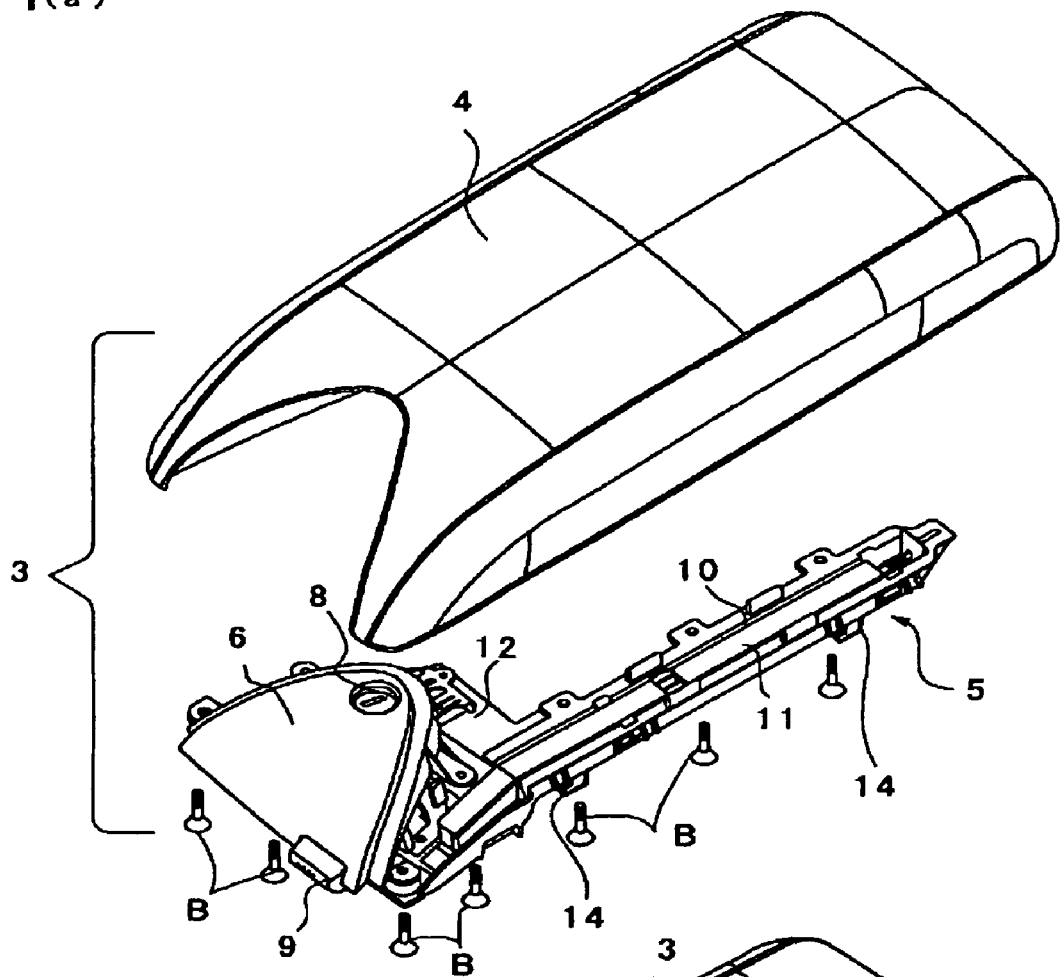
FIGS. 1(*a*) and (*b*) are schematic perspective views in a case where the lock device according to the present invention is applied to the lid of a console box.
Figure 1B:
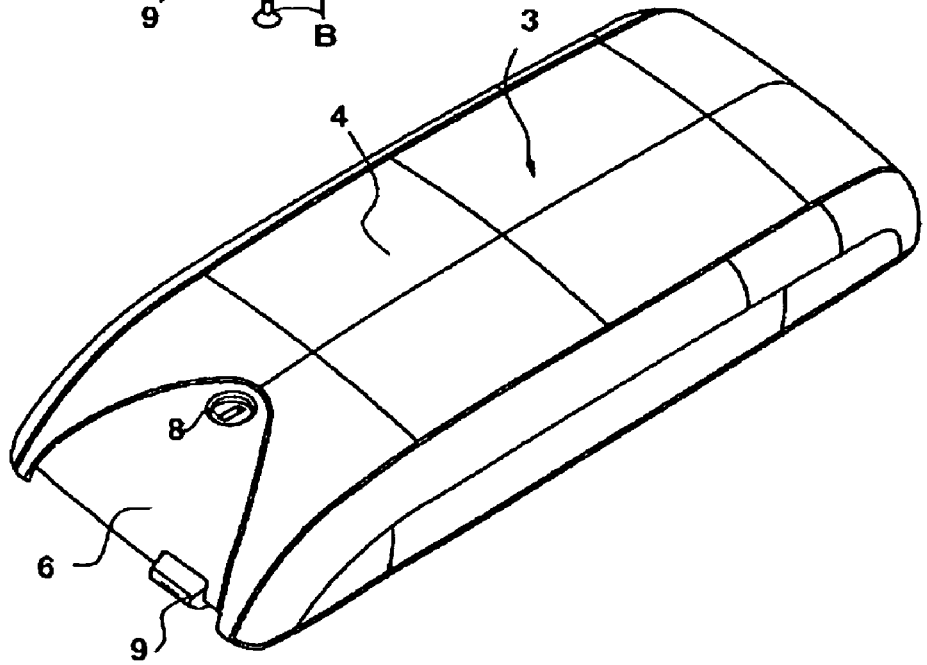

The lock device according to the present invention is not limited to a specific application as long as the lock is disposed in a lid member so as to be capable of keeping a counterpart of a main body closed. As a specific example, the lock device according to the present invention is preferably applied to a case where, as shown in FIGS. 1(*a*) and (*b*), and FIGS. 2(*a*) and (*b*), a lid 3 as the lid member is selectively switched from a closed state to an open state and vice versa with respect to a box 1 as the main body, the lid 3 includes a cylinder lock 8 and is configured to close an opening end is of the box 1 and to keep the opening end closed when being locked.

Specifically, in FIGS. 1(*a*) and (*b*), and FIGS. 2(*a*) and (*b*), reference numeral 1 designates the console box (hereinbelow, referred to as the box), which is disposed in a proper portion of a center console 2 extending from a middle position of an instrument panel in a right-to-left direction toward a rear direction in the interior of an automobile, and which has a housing space defined therein to have a great length in a front-to-rear direction and a large volume and to have a top opening formed therein. The box 1 is configured to have the top opening opened and closed by the lid 3. The lid 3 is configured to rest on a fringe portion defining the top opening and has a first end and a second end extending in a longitudinal direction, the first end being swingably coupled to a counterpart of the box 1 through a plurality of members 3*a* and a guide member 3*b* as in Patent Document 1, the second end being selectively locked to and unlocked from engagement holes 15 formed in the fringe portion.

The lid 3 is formed of a main part 4 having a rear side in a longitudinal direction cut out in a substantially triangular shape, a lock unit 5 fixed to a bottom of the main part 4 through, e.g. a plurality of screws B, and a finishing material 16 attached to lower sides of the main part 4 and the lock unit 5, i.e. an inner side of the lid 3.

Figure 5:
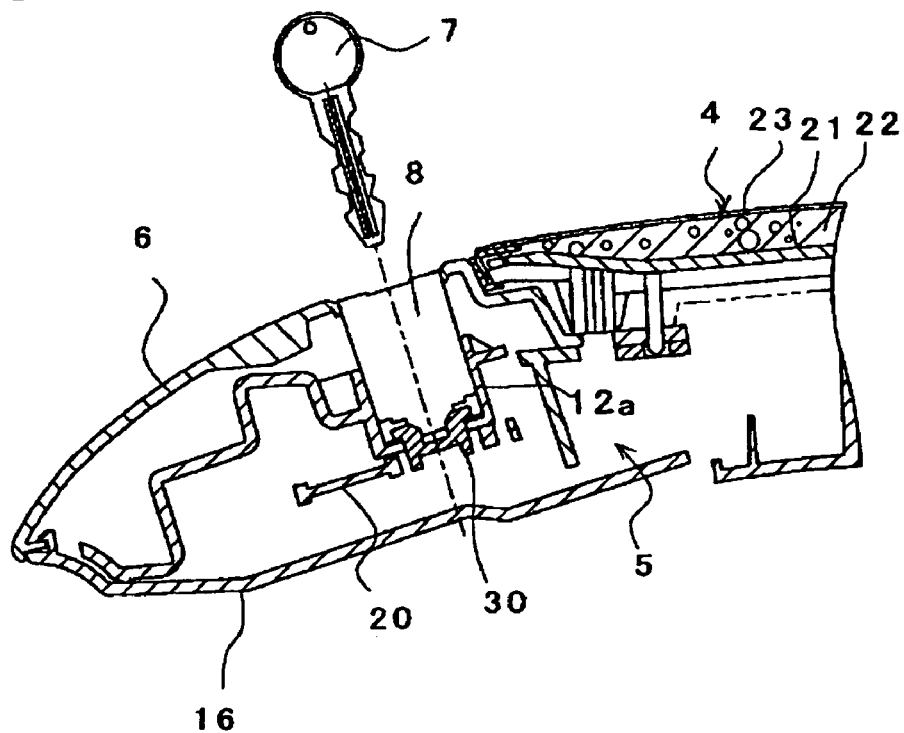
FIG. 5 is a partial schematic view taken along line A-A of FIG. 4(*b*)
Figure 6:
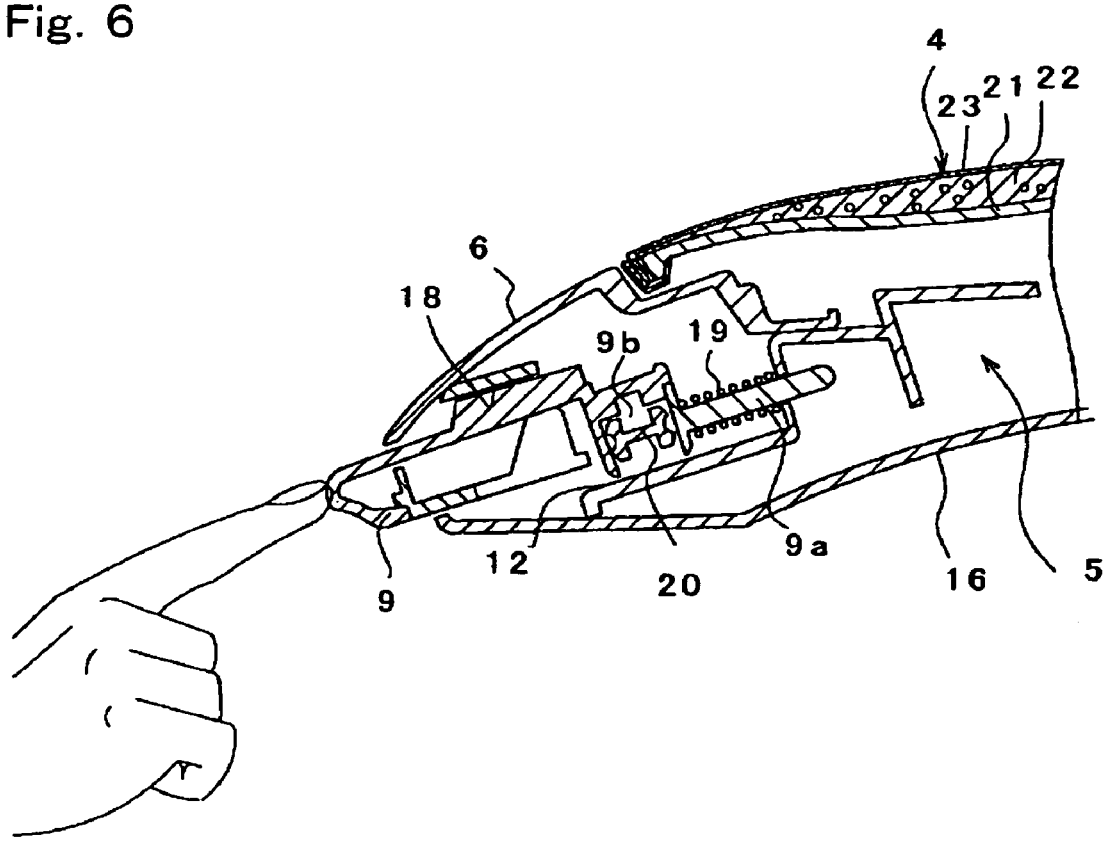
FIG. 6 is a partial schematic view taken along line B-B of FIG. 4(*b*)

The main part 4 is formed of a core material 21, a pad 22 laminated on an outer side of the core material 21, and an outer covering material 23 covering an outer side of the pad 22 as schematically and partially shown in FIG. 5 and FIG. 6. Such a layered structure provides the main part with a cushiony surface texture so as to cause the main part to serve as not only a lid but also an armrest. Needless to say, such a layered structure may be designed according to costs, weight or another factor.

(Structure)

The lock unit 5 includes a base plate 12 and a cover 6 mounted to the base plate so as to be disposed in the triangularly cutout portion of the main part 4 and has respective parts assembled to form the lock device according to the present invention. The cover 6 is formed of a resin-molded article and has a mounting portion, a notched portion, and an exposure hole formed therein, the mounting portion serving to mount the cover to the base plate 12, the notched portion serving to allow an operating button to be protruded and depressed, and the exposure hole serving to expose the cylinder lock. The base plate 12 is formed of a resin-molded article and has, e.g. a cylindrical holder 12a (see FIG. 5) and a casing 18 (see FIG. 6) formed in a base portion having a size sufficient to receive the cover 6, the cylindrical holder serving to support the cylinder lock 8, and the casing serving to slidably support the operating button 9. The base plate also has a guide rail portion 10 extending from one end thereof in a substantially linear fashion. The guide rail portion 10 has, e.g. a guide groove 10a formed therein so as to be of a U-character shape in section in order to slidably guide a slider 11 as an engagement member (see FIG. 3).

The guide groove 10a has unshown clearance slots formed in a bottom side so as to allow respective engageable portions 14 of the slider to project therefrom with play. The inner side of the lid 3 is decorated with the above-mentioned finishing material 16, which covers the inner side except for the respective clearance holes and the respective engagement members 14 projecting through the clearance holes formed in the finishing material 16.

The lock unit 5 also includes a coupling member 20 as well as the cylinder lock 8, the operating button 9 and the slider 11, the coupling member being disposed so as to be slidable in a direction substantially orthogonal to the depressing direction of the operating button 9. Each of the button 9, the slider 11 and the coupling member 20 is a resin-molded article.

The cylinder lock 8 may be of a type, which is configured to swingably switch a driving portion or a cylinder portion from an unlocked position to a locked position and vice versa by turning an inserted key 7 as seen from FIG. 5 and FIGS. 7(a) to (d). The cylinder lock includes a rotor 30 mounted to a bottom end of the cylinder portion and an arm 31 mounted to the rotor 30. The cylinder lock 8 is supported in the above-mentioned cylindrical holder 12a and has a leading edge exposed through the exposure hole formed in the cover 6, the leading edge serving to receive the key 7.

The operating button 9 is formed in a substantially tongue shape and includes a rod 9a and a guide hole 9b as a lateral hole, the rod extending forward from a leading end of the operating button, and the guide hole being disposed at a position behind the leading end and extending in a direction orthogonal to the sliding direction of the operating button 9 as seen from FIG. 3, FIG. 6 and FIGS. 7(a) to (d). The operating button 9 is disposed so as to be slidable in a front-to-rear direction along the casing 18, partly projecting outward from the cover 6 and a corresponding rear end of the base plate 12, and the rod 9a is slidably supported through and by a guide hole formed in a stepped end of the base plate 12 as shown in FIG. 6. In the shown embodiment, the rod 9a has a coiled spring 19 disposed around an outer periphery thereof as shown in FIG. 6. By this arrangement, the operating button 9 is constantly biased toward a backward position as the initial position under the biasing force of the coiled spring 19.

Figure 3:
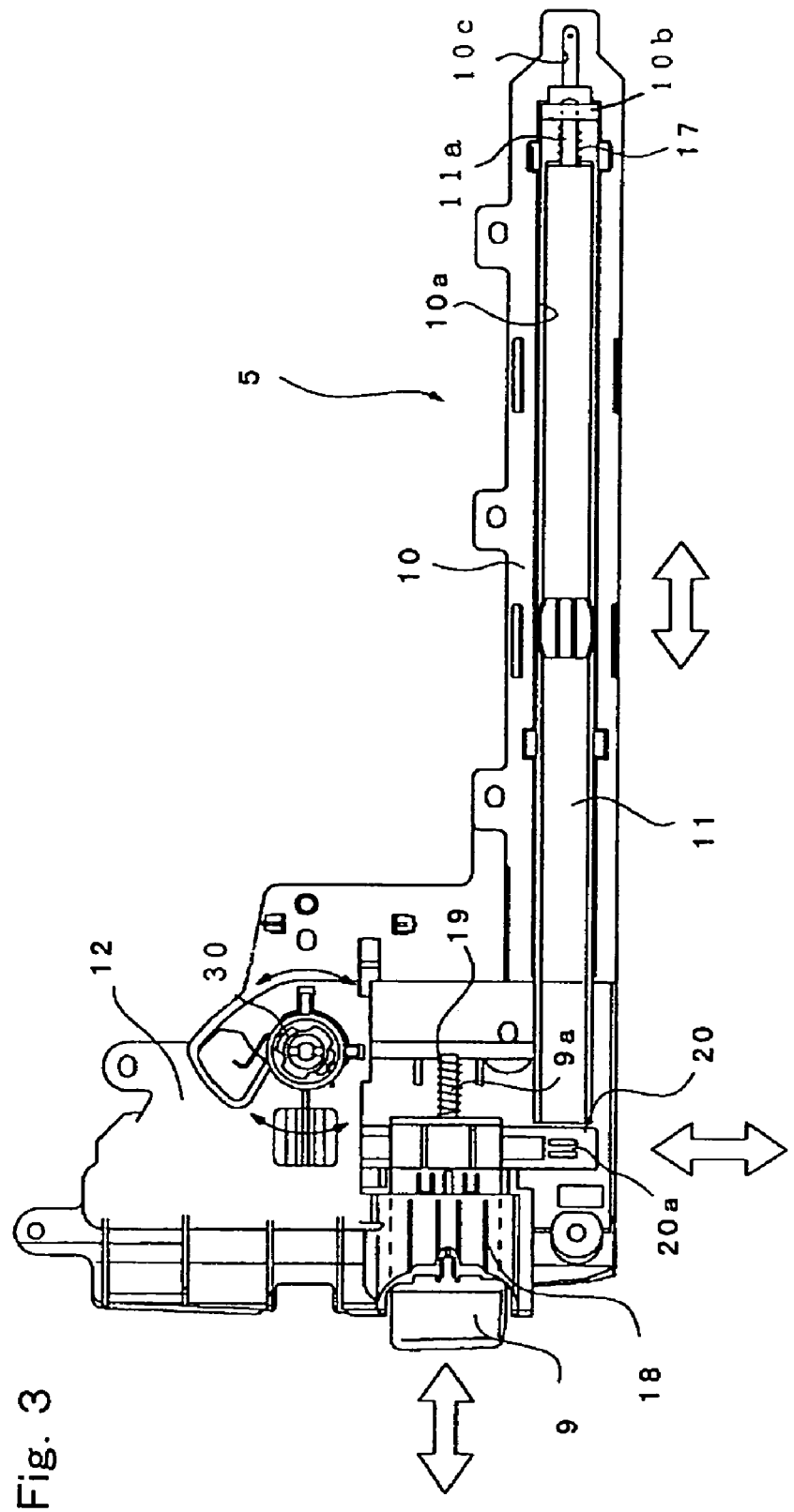
FIG. 3 is a plan view showing the lock device unitized as a lock unit.
Figure 4A:
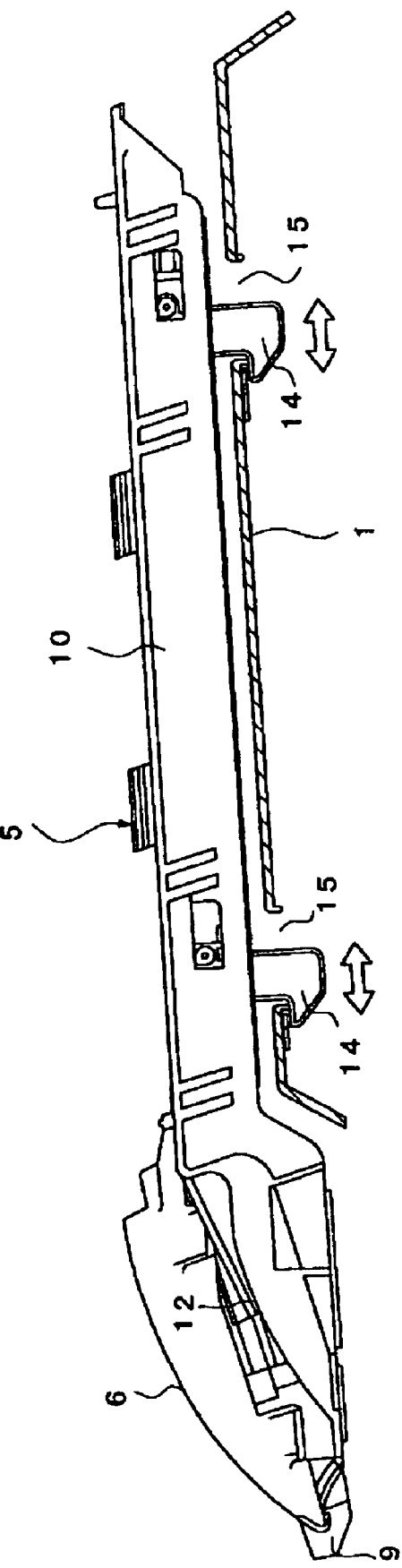
FIGS. 4(*a*) and (*b*) are a side view and a front view of the lock unit.
Figure 4B:
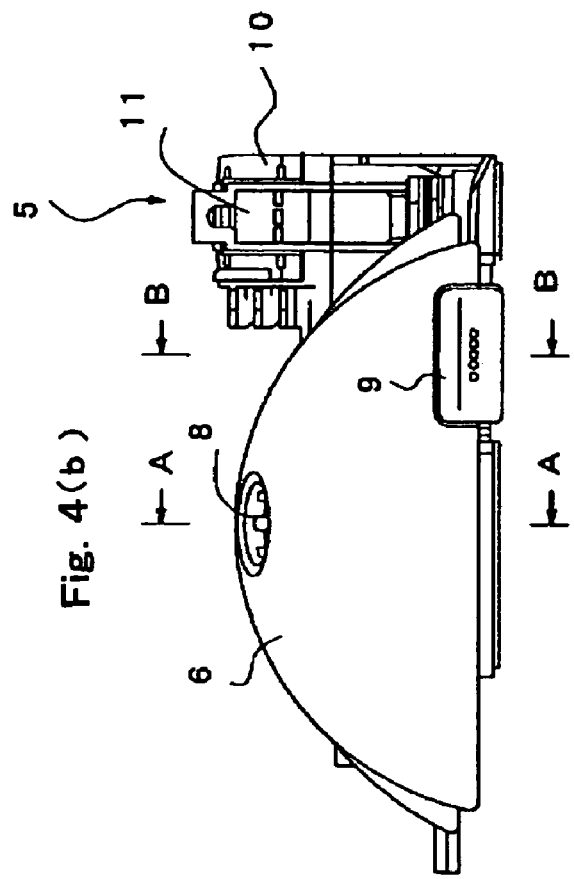

The plural engageable portions (two engageable portions in the shown embodiment) 14, which serves for a locking operation, are disposed so as to project from a front position and a rear position of the bottom side (lower side) of the slider 11 as shown in FIG. 3 and FIGS. 4(a) and (b). The respective engageable portions 14 are disposed at such an interval and are formed in such a shape as to cooperate with the engagement holes 15 formed in the counterpart of the fringe portion defining the top opening of the box 1. The slider 11 has a rod 11a formed on a front end (a right end in FIG. 3) so as to project forward as seen from FIG. 3. The guide groove 10a has a holed wall 10b and an escaping groove 10c for escaping the rod 11a, accordingly formed on a front side thereof.

The above-mentioned slider 11 is disposed in the guide rail 10 so as to be slidable along the guide groove 10a in the front-to-rear direction in such a state that the rod 11a passes through the hole in the wall 10b. In the shown embodiment, the rod 11a has a coiled spring 17 disposed around an outer periphery thereof. By this arrangement, if the operating button 9 is depressed against the biasing action of the coiled spring 19 for examples the slider is slid forward against the biasing action of the coiled spring 17 through the coupling member 20, which will be described in detail later. By this sliding movement, the engageable portions 14 are set in such a state as to be disengageable from the engagement holes 15. When the depressing force is released from the operating button 9, the operating button is slid to the original position by the biasing action of the coiled spring 19. Simultaneously, the slider 11 is biased and moved to a rear position as the original position, i.e. an engageable position by the biasing action of the coiled spring 17.

The coupling member 20 is configured to have one end confronting to a rear end of the slider 11 and the other end formed in a bar shape, being set to slidably pass through the guide hole 9b of the operating button 9. The other end has such a length to be disposed in the vicinity of a portion of the arm 31 close to the rotor in the cylindrical portion of the cylinder lock 8. The one end has a rattle-preventing convex portion 20a formed on an upper side and an unshown elastic projection formed on a lower side, the convex portion being formed of slits and a round portion between the slits. When the coupling member 20 is actuated through the key 7 of the cylinder lock 8 for the locking operation, the elastic projection is slid toward the rotor 30 through the rotor 30 and a linkage described later. In that time, the elastic projection is brought into contact with a counterpart of the operating button 9 so that the coupling member 20 is limited so as not to be pulled toward the rotor 20 further than needed. The other end is coupled to a free end of the arm 31 in an operative way, i.e. through the linkage, which serves to transform the rotary movement of the arm 31 of the rotor 30 into a liner movement or the like of the coupling member 20. It should be noted that the other end of the coupling member 20 extends toward the rotor 30 and the arm 31 from an opening formed in a counterpart of a side wall of the casing 18, which guides the operating button 9.

The above-mentioned linkage is formed of boss portions 32 projecting from a leading edge of the arm 31 of the rotor 30, and cam grooves 33 formed in the other end of the coupling member 20 so as to be brought into swingable engagement with the boss portions as schematically shown in FIGS. 7(a) to (d). Although not shown in detail, the boss portions 32 are disposed so as to project from upper and lower sides of the arm 31. The coupling member 20 is provided with a portion having a U-character shape in section, and the cam grooves 33 are formed in the respective opposite parts of such a portion having a U-character shape in section. The respective boss portions 32 of the arm 31 are brought into engagement with the respective cam grooves 33 from inside of such a portion having a U-character shape in section, which is a part of the coupling member 20. By this arrangement, the coupling member 20 is slid in the guide hole 9b and is selectively pulled toward the rotor 30 and to the original position through the above-mentioned linkage, being interlocked with the locking operation and is the unlocking operation of the cylinder lock 8 by the key 7. In the unlocked position shown in FIG. 3, the one end of the coupling member 20 is set so as to confront to the rear portion of the slider 11.

(Operation)

The main operation of the lock unit 5 as the above-mentioned lock device will be described in detail in reference to FIGS. 7(a) to (d). The respective form parts shown in FIG. 7(a) to (d) are shown in simplified form in order to readily understand the operation. FIGS. 7(a) and (b) show an operation of the cylinder lock 8 for locking. Specifically, FIG. 7(a) shows a state where the cylinder lock 8 is locked to slide the coupling member 20 toward the rotor 30 through the above-mentioned linkage with the result that the one end of the coupling member is completely away from the rear portion of the slider 11 to prevent the depressing operation of the operating button 9 from being transmitted to the slider 11.

FIG. 7(b) shows an operation made when the operating button 9 is depressed during the absence of the transmission to the slider, i.e. a state where the action applied to the operating button is made infective. In this arrangement, when the operating button 9 is depressed against the biasing action of the above-mentioned coiled spring 19 (see FIG. 6), the operating button 9 is slid along with the coupling member 20 in a forward direction as the depressing direction of the operating button 9. The coupling member 20 is moved forward in parallel, being held by the operating button 9. In that time, in the above-mentioned linkage, the boss portions 32 of the arm 31 escape from one end of each of the cam grooves 33 in the other end of the coupling member 20 to the other end of each of the cam grooves. Needless to say, the lid 3 is held in the closed state, being kept locked by the above-mentioned operation.

On the other hand, FIGS. 7(c) and (d) show an operation made when the cylinder lock 8 is unlocked. Specifically, FIG. 7(c) shows a state where the cylinder lock 8 is rotated to an unlock position by operating the key 7. By this unlocking operation, the coupling member 20 is slid to a direction to be away from the rotor 30 through the above-mentioned linkage, and the one end of the coupling member confronts to the rear end of the slider 11.

Figures 2A, 2B:
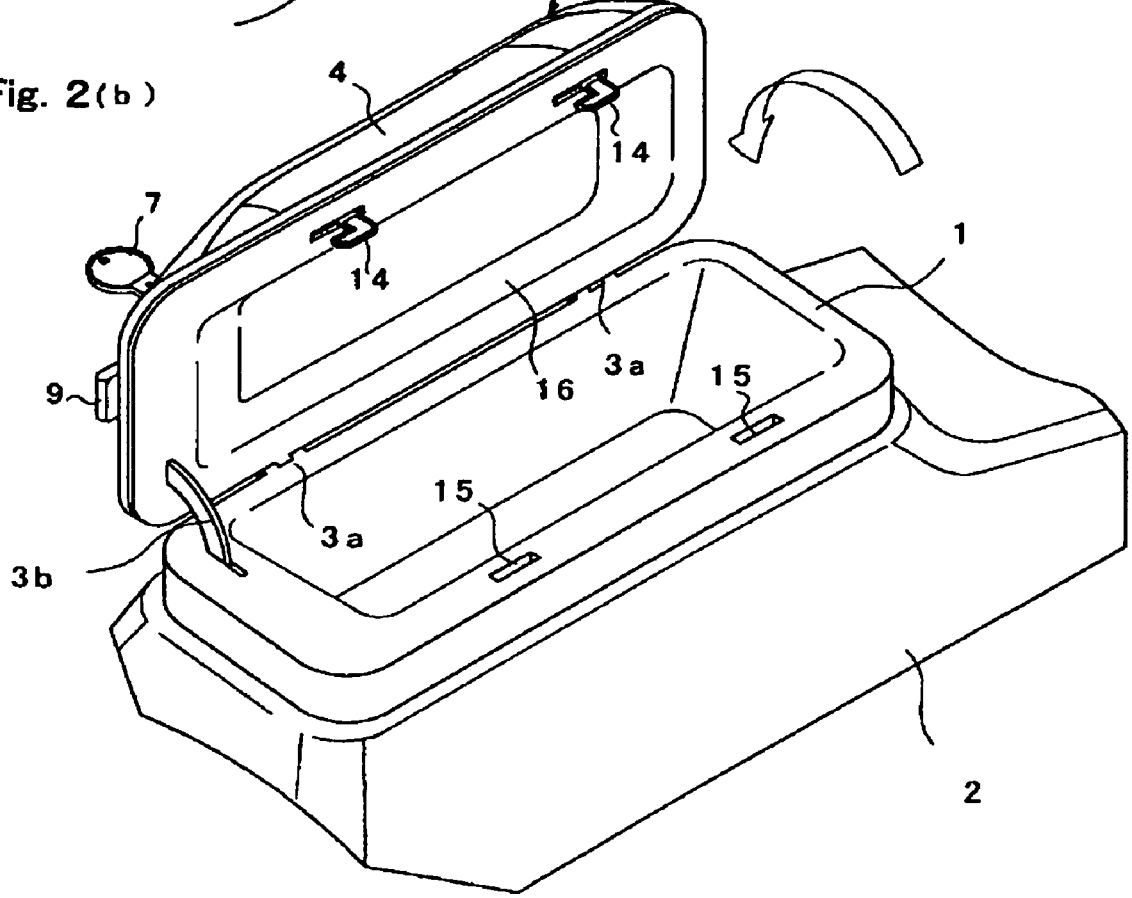
FIGS. 2(*a*) and (*b*) are schematic perspective views showing a closed state and an open state of the lid.

FIG. 7(d) shows an operation made when the operating button 9 is depressed in an unlocked position. By this arrangement, when the operating button 9 is depressed against the biasing action of the above-mentioned coiled spring 19 (see FIG. 6), the operating button 9 is slid along with the coupling member 20 in the forward direction as the depressing direction of the operating button, and the coupling member 20 is moved forward, being brought into contact with the rear end of the slider 11. As a result, the slider 11 is moved forward until the engageable portions 14 shown in FIG. 4(a) are allowed to be out of engagement with the engagement holes 15. Thus, the lid 3 can be opened through the members 3a and the guide member 3b disposed on the one edge of the box as shown in FIG. 2(b).

In the above-mentioned arrangement, when any unauthorized action to the operating button is set to be made ineffective in the locked position, the coupling member 20 is moved along with the operating button 9 in parallel, and when the operating button 9 is operated in the unlocked position, the slider 11 is set to be slid through the coupling member 20 to bring the engageable portions 14 out of engagement with the engagement holes formed in the main body. Thus, the respective parts are unlikely to be subjected to a large load, are free of local wear and can improve operating performance and quality. In the above-mentioned arrangement, it is possible to effectively and reliably transmit respective operating forces to the respective parts to stably maintain the operating performance since the coupling member 20 is disposed so as to be orthogonal to the operating button 9 and since the slider 11 is disposed in the same direction as the depressing direction of the operating button 9. It is also possible to stably maintain the operating performance since the coupling member 20 is linearly slid through the above-mentioned is linkage to operatively couple the operating button 9 to the slider 11 and disconnect the operating button from the slider. Since the plural engageable portions 14 are brought into engagement with the corresponding engagement holes 15 formed in the box 1 in the locked position, the lock device according to the present invention is advantageous not only in that it is unlikely that a gap is formed between the lid 3 and the counterpart of the box 1 even if the lid 3 has a great length but also in that it is possible to double the resistance to unauthorized unlocking actions, i.e. a force for keeping the lid engaged with the box 1 in the locked position.

Obviously, numerous modifications and variations may be made to detailed parts, such as the above-mentioned linkage, as needed as long as they are away from the sprits of the present invention. For example, the lid member may be configured so that the lid 3 is constantly biased to be swung to an open state with the result that the lid automatically bounces toward the open state, being interlinked with an operation for bringing the lid out of the engagement with the respective engageable portions 14.

The entire disclosure of Japanese Patent Application No. 2006-114304 filed on Apr. 18, 2006 including specification, claims, drawings and summary are incorporated herein by reference in its entirety.

The invention claimed is:

1. A lock device, comprising:
   a lock configured to lock and unlock a lid member, the lid member being held at a counterpart of a main body in a closed state;
   an operating button to be pushed in one direction for an unlocking operation;
   a slidable engagement member having an engageable portion, the engageable portion being adapted to selectively engage with and disengage from the counterpart of the main body;
   a rotor rotated by a locking and the unlocking operations of the lock;
   a coupling member disposed between the operating button and the engagement member, said coupling member being arranged so that the operating button and the engagement member are set in an interlocked state by the unlocking operation and are set to be free of the interlocked state by the locking operation; and
   an arm disposed on the rotor and being operatively coupled to one end of the coupling member to slide the coupling member in synchronization with rotation of the rotor,
   wherein the coupling member is supported so as to be slidable in a direction substantially orthogonal to a depressing direction of the operating button, and the engagement member is supported so as to be slidable in substantially a same direction as a depressing direction of the operating button so that the engagement member slides through the coupling member adapted to disengage the engagement member from the main body by operating the operating button when the lock is set in an unlocked position.

2. The lock device according to claim 1, wherein the engagement member has the engageable portion disposed at at least two positions in a sliding direction.

3. The lock device according to claim 1, further comprising a biasing member for returning the operating button to an original position after the operating button is operated, and another biasing member for returning the engagement member in one direction.

4. A combination comprising the lock device according to claim 1, a console box as a main body, and a lid member, wherein the lid member is swingably coupled to the console box at one end thereof in a longitudinal direction thereof and has the engagement member disposed along the other end in the longitudinal direction.

5. The lock device according to claim 1, wherein the coupling member has a cam groove at the one end of the coupling member.

6. The lock device according to claim 5, wherein the arm has a boss portion projecting from an edge of the arm, and the boss portion is engaged with the cam groove.

7. The lock device according to claim 6, wherein the coupling member is located away from the engagement member when the lock is turned into a locked position.

8. The lock device according to claim 7, wherein the coupling member pushes the engagement member upon actuation of the operation button when the lock is turned into the unlocked position, and the coupling member and the engagement member are engaged at the engageable portion.

* * * * *